United States Patent
Wuu

(10) Patent No.: US 7,915,183 B2
(45) Date of Patent: Mar. 29, 2011

(54) WAX COATINGS, METHODS OF MAKING COATED ARTICLES AND COATED ARTICLES THEREFROM

(75) Inventor: Fuushern Wuu, Englewood, CO (US)

(73) Assignee: Luzenac America, Inc., Greenwood, Village, CO (US)

( * ) Notice: Subject to any disclaimer, the term of this patent is extended or adjusted under 35 U.S.C. 154(b) by 0 days.

(21) Appl. No.: 12/174,472

(22) Filed: Jul. 16, 2008

(65) Prior Publication Data

US 2009/0022978 A1 Jan. 22, 2009

Related U.S. Application Data

(60) Provisional application No. 60/950,043, filed on Jul. 16, 2007.

(51) Int. Cl.
*B32B 5/02* (2006.01)
(52) U.S. Cl. .......................... 442/90; 442/85
(58) Field of Classification Search ................... 442/85, 442/90
See application file for complete search history.

(56) References Cited

U.S. PATENT DOCUMENTS

| | | |
|---|---|---|
| 3,723,169 A | 3/1973 | Guastella et al. |
| 3,790,402 A | 2/1974 | Eastes |
| 4,175,977 A | 11/1979 | Heaton et al. |
| 4,184,914 A | 1/1980 | Jenkins |
| 4,778,696 A | 10/1988 | King |
| 4,826,714 A | 5/1989 | King |
| 4,954,373 A | 9/1990 | Jones |
| 5,026,457 A | 6/1991 | Eichinger et al. |
| 5,539,035 A | 7/1996 | Fuller et al. |
| 5,635,297 A | 6/1997 | Ogawa et al. |
| 6,210,475 B1 | 4/2001 | Dauplaise et al. |
| 6,228,212 B1 | 5/2001 | Heise et al. |
| 6,270,878 B1 | 8/2001 | Wegele et al. |
| 6,294,265 B1 | 9/2001 | Ioelovich et al. |
| 6,416,620 B1 | 7/2002 | Narancic et al. |
| 6,440,269 B1 | 8/2002 | Freeburn |
| 6,531,196 B1 | 3/2003 | Aho et al. |
| 6,545,079 B1 | 4/2003 | Nurmi et al. |
| 6,824,651 B2 | 11/2004 | Lasmarias et al. |
| 6,833,025 B2 | 12/2004 | Hakansson et al. |
| 7,135,508 B2 | 11/2006 | Chaiko et al. |
| 7,255,776 B2 | 8/2007 | Shoshany et al. |
| 7,279,071 B2 | 10/2007 | Williams et al. |
| 2003/0188839 A1 | 10/2003 | Urscher |
| 2004/0067356 A1 | 4/2004 | Hakansson et al. |
| 2004/0221976 A1 | 11/2004 | Williams et al. |

FOREIGN PATENT DOCUMENTS

| | | |
|---|---|---|
| WO | WO 96/15321 | 5/1996 |
| WO | WO 97/36050 | 10/1997 |
| WO | WO 03/002342 | 1/2003 |

OTHER PUBLICATIONS

Background of the Invention for the Above-Captioned Application.
International Search Report for International (PCT) Patent Application No. PCT/US08/70138, mailed Sep. 26, 2008.
Written Opinion for International (PCT) Patent Application No. PCT/US08/70138, mailed Sep. 26, 2008.
Background of the invention for the above captioned application (previously provided).

*Primary Examiner* — Lynda Salvatore
(74) *Attorney, Agent, or Firm* — Sheridan Ross P.C.

(57) ABSTRACT

A barrier coating for paper and a method of making the coated paper using a wax coating composition containing an inorganic mineral filler is provided. The inorganic mineral filler imparts a viscosity to the wax coating composition similar to the viscosity of the wax coating composition in the absence of the inorganic mineral filler. Coated paper products are also provided.

33 Claims, No Drawings

US 7,915,183 B2

WAX COATINGS, METHODS OF MAKING COATED ARTICLES AND COATED ARTICLES THEREFROM

CROSS REFERENCE TO RELATED APPLICATIONS

The present application claims priority under 35 U.S.C. §119(e) from U.S. Provisional Application Ser. No. 60/950,043, filed Jul. 16, 2007, entitled "Wax Coating Mixtures", to Wuu, which is incorporated in its entirety herein by this reference.

FIELD OF THE INVENTION

This invention relates to coatings providing moisture resistance to paper products, such as paper, paperboard, and corrugated paper containers, more specifically wax coated paper products having moisture barrier properties.

BACKGROUND OF THE INVENTION

Coating compositions are commonly used as moisture barrier coatings on paper and paperboard products. Moisture barrier wrapping or packaging for moist, wet, or fatty foods typically comprises a moisture barrier coating applied to a paper product. These moisture resistant wrappings and/or packages are used to ship and store fresh, perishable foods such as poultry, fish, meat, and cold-storage foods.

Examples of commercial barrier coatings include solvent-based coatings, water-based coatings, resinous coatings, powder coatings, and radiation curable coatings. Typically, the barrier coating often includes additional components, such as, polyethylene waxes, fatty acids, surfactants, dispersants, binders, and/or pigments. A need remains for barrier coatings of lower cost and easier application and preparation, while maintaining the barrier properties and compatibility with existing coating and container production equipment.

SUMMARY OF THE INVENTION

These and other needs are addressed by the various embodiments and configurations of the present invention. The present invention is directed generally to the wax coatings, and methods of making coated articles and coated articles therefrom.

One aspect of the present invention is a coating composition comprising a wax and an inorganic hydrophobic mineral filler. In one embodiment, the inorganic hydrophobic mineral filler comprises from about 5 wt % to about 90 wt % of the coating composition. In a preferred embodiment, the inorganic hydrophobic mineral filler comprises from about 5 wt % to about 60 wt % of the coating composition. In a more preferred embodiment of the present invention, the inorganic hydrophobic mineral filler comprises about 30 wt % of the coating composition. In another preferred embodiment, the coating composition has a water vapor transmission rate of less than about 50 g/m$^2$/24 hours as measured at 23° C. and 50% relative humidity.

The hydrophobic mineral filler of the coating composition can be selected from the group consisting of clays, calcium carbonates, dolomites, micas, alumina trihydrates, magnesium hydroxides, titanium dioxides, barium sulphates, silicas, alkali metal aluminosilicates, talcs, alkaline-earth metal aluminosilicates, phyllosilicate minerals, and mixtures thereof. In one preferred embodiment of the present invention, the inorganic hydrophobic mineral filler comprises talc.

In one embodiment, the inorganic hydrophobic mineral filler is formed by one of surface treatment, bulk treatment or compounding of an inorganic an inorganic hydrophilic material.

In another preferred embodiment, the inorganic hydrophobic mineral filler comprises particles. In a more preferred embodiment, at least 50 wt % of the inorganic hydrophobic particles have a particle size of less than about 45 μm. In another preferred embodiment, the inorganic hydrophobic mineral filler has a contact angle with water. The preferred contact angle of the inorganic mineral filler with water is at least about 90°, and the more preferred contact is at least about 120°. In yet another preferred embodiment, the inorganic hydrophobic mineral filler has a moisture content of less than about 45 wt %.

The wax of the coating composition can be selected from the group consisting of microcrystalline waxes, paraffin waxes, synthetic waxes, semi-crystalline waxes, petroleum waxes, chemically modified waxes, animal waxes, vegetable waxes, mineral waxes, straight chain saturated n-alkane hydrocarbons, isoparaffinic hydrocarbons, naphthenic hydrocarbons, n-alkane saturate hydrocarbons, paraffin and microcrystalline wax mixtures, Fisher-Tropsch waxes, polyethylene waxes, polypropylene waxes, polymethylene waxes, chemically modified waxes, polymerized alpha-olefins waxes, polyethylene-block-polyethylene glycol waxes, polyethylene mono-alcohol waxes, polyethylene-block-polyethylene glycol and polyethylene mono-alcohol wax mixtures, paraffin waxes chemically modified by adduct formation, cracking reaction, and free radical reaction, and mixtures thereof.

Another aspect of the present invention is a coated article comprising a substrate and the coating composition. In a preferred embodiment, the inorganic hydrophobic mineral filler of the coated article is talc.

In a preferred embodiment, the substrate can be a fibrous substrate which can be selected from the group consisting of paper, paperboard, woven material, non-woven material, super-calendered krafts, clay-coated krafts, poly-coated krafts, corrugated board, and cellulosic-containing materials.

Yet another aspect of the present invention is a method of making a coated article comprising applying the coating composition to at least one surface of a substrate. In a preferred embodiment, the inorganic hydrophobic mineral filler of the coated article is talc.

The substrate of the coated article can be selected from the group consisting of paper, paperboard, woven material, non-woven material, super-calendered krafts, clay-coated krafts, poly-coated krafts, corrugated board, and cellulosic-containing materials.

In making the coated article, the applying step can be selected from the group consisting of curtain coating, roller coating, rod coating, cascade coating, spray coating, impregnation coating, immersion coating, saturation coating, slot orifice coating, calendar coating, extrudable coating, ink-jet printing, gravure printing, pad printing, flexographic printing, relief printing, screen printing, and rotogravure printing.

DETAILED DESCRIPTION OF THE INVENTION

One aspect of the present invention is a coating composition having barrier properties. In one embodiment, the coating composition comprises a wax and an inorganic hydrophobic mineral filler. In another embodiment, a dispersion (and/or suspension) of the inorganic hydrophobic mineral filler in the wax is formed in the absence of emulsifers, surfactants or dispersants. It has been found that, the inorganic hydrophobic mineral typically: (1) is chemically and/or physically stable when dispersed and/or suspended in the wax; (2) is easily mixed, dispersed and/or suspended in the wax; and (3) maintains the viscoelastic properties of the molten wax, that is, the viscosity of the molten wax with the inorganic hydrophobic mineral filler remains within about a multiple from about 1 to about 100 of the viscosity of the molten wax. The coating composition has moisture barrier properties and is easily produced at a low cost. The inorganic hydrophobic mineral filler reduces raw material costs while maintaining the coating composition barrier and processing properties.

One component of the coating composition is the wax. The term wax means any hydrophobic material having a melting point commonly above about 45° C., a malleability at a normal ambient temperature, a relatively low solubility in water, and a relatively low viscosity when melted. While not wanting to be bound by any theory, the wax has a melt viscosity less than about 1,000 centipoise. Preferably, the wax has a melt viscosity less than about 500 centipoise. Typical waxes useful in accordance with the present invention include a wide variety of waxes and resinous compositions. Non-limiting examples of suitable waxes include microcrystalline waxes, paraffin waxes, synthetic waxes, semi-crystalline waxes, petroleum waxes, chemically modified waxes, animal waxes, vegetable waxes, mineral waxes or mixtures thereof.

Microcrystalline waxes are another type of wax. The microcrystalline waxes typically comprise isoparaffinic, naphthenic and n-alkane saturated hydrocarbons. The microcrystalline waxes typically have a melt point from about 54° C. to about 99° C. and a melt viscosity at 99° C. of about 8 to about 25 centipoise. Microcrystalline waxes have an oil content from about 0.5 wt % to about 12 wt %.

Paraffin waxes typically comprise from about 75 wt % to about 100 wt % n-alkane straight chain saturated $C_{20}$- to $C_{40}$-hydrocarbons. The paraffin waxes commonly have a molecular weight of about 280 daltons to about 560 daltons, a melt point typically from about 43° C. to about 77° C., a melt viscosity at 99° C. commonly of about 2 to about 10 centipoise, and typically contain less than about 0.5 wt % oil.

Waxes also comprise synthetic waxes, which commonly include, but are not limited to, Fisher-Tropsch waxes, polyethylene waxes, polypropylene waxes, polymethylene waxes, chemically modified waxes, and polymerized alpha-olefins waxes.

Examples of semi-crystalline waxes include without limitation, polyethylene-block-polyethylene glycol waxes, polyethylene monoalcohol waxes, and mixtures thereof.

Petroleum waxes are yet another type of waxes. Petroleum waxes comprise a mixture of paraffin and microcrystalline waxes.

Chemically modified waxes typically include paraffin waxes that have undergone chemical reactions, such as, adduct formation, cracking reaction, and/or free radical reaction.

It can be appreciated that the coating composition comprising the wax and the inorganic hydrophobic mineral filler can include wax combinations of two or more of the waxes described above.

Another component of the coating composition is the inorganic hydrophobic mineral filler. As used herein, the inorganic hydrophobic mineral filler is typically a particulate substance mixed, dispersed and/or suspended in the wax. The hydrophobic nature of the mineral filler allows it to mix well with the wax and form a coating of uniform consistency and appearance. The hydrophobic nature of the mineral filler can be characterized in some embodiments by having a contact angle with water of at least about 90°. Preferably, the inorganic hydrophobic mineral filler has a contact angle with water of at least about 100°, more preferably the contact angle with water is at least about 120°.

Another characteristic of the hydrophobic mineral filler in some embodiments is that at least about 50 wt % of the inorganic hydrophobic mineral filler has a particle size of less than about 45 μm. In a preferred embodiment, at least about 80 wt % of the inorganic hydrophobic mineral filler has a particle size of less than about 45 μm. In another embodiment, at least about 50 wt % of the inorganic hydrophobic mineral filler has a particle size of less than about 75 μm, and preferably at least about 80 wt % of the inorganic hydrophobic mineral filler has a particle size of less than about 75 μm. Conformance of the hydrophobic mineral filler with the foregoing characteristics can help provide a coating composition that is uniform in consistency and appearance because of a relative absence of large particles. In addition, in some instances it has been observed that, within the foregoing constraints, smaller size particles are generally preferred in lower quantities. The smaller size particles commonly increase the viscosity of the coating composition more than larger size particles. Stated another way, preferably the 80 wt % of the inorganic hydrophobic mineral filler with a particle size of less than about 45 μm has a Gaussian particle size distribution typically encompassing more larger size particles than smaller size particles. It has been found that, typically a mixture of particle sizes where at least about 80 wt % of the inorganic hydrophobic mineral filler particles have a particle size of less than about 45 μm has a statistical distribution of smaller and larger size particles suitable for dispersing and/or suspending the inorganic hydrophobic filler in the molten wax.

It has also been found that, the moisture content of the inorganic hydrophobic mineral filler may affect the dispersibility and/or suspensibility of the inorganic hydrophobic mineral filler in the molten hot wax. In general, the greater the moisture content of the inorganic hydrophobic mineral material the less dispersible and/or suspendible the inorganic hydrophobic mineral filler is within the molten wax. Preferably, the moisture content of the inorganic hydrophobic mineral filler is less than about 45 wt %. More preferably, the moisture content of the inorganic hydrophobic mineral filler is less than about 20 wt %.

In various embodiments, the inorganic hydrophobic mineral filler comprises in its native state an inorganic hydrophobic and/or a hydrophilic mineral. Examples of suitable inorganic hydrophobic and/or hydrophilic minerals include without limitation clays, calcium carbonates, dolomites, micas, alumina trihydrates, magnesium hydroxides, titanium dioxides, barium sulphates, silicas, alkali metal aluminosilicates, talcs, alkaline-earth metal aluminosilicates, phyllosilicate minerals, and mixtures thereof. Phyllosilicate minerals can include, without limitation, antigorite [$Mg_3Si_2O_5(OH)_4$], chrysotile [$Mg_3Si_2O_5(OH)_4$], lizardite [$Mg_3Si_2O_5(OH)_4$], kaolinite [$Al_2Si_2O_5(OH)_4$], talc [$Mg_3Si_4O_{10}(OH)_2$], pyrophyllite [$Al_2Si_4O_{10}(OH)_2$], muscovite [$KAl_2(AlSi_3O_{10})(OH)_2$], phlogopite [$KMg_3Si_4O_{10}(OH)_2$], biotite [$K(Mg,Fe)_3(AlSi_3O_{10})(OH)_2$], lepidolite [$K(Li,Al)_{2-3}(AlSi_3O_{10})(OH)_2$], margarite [$CaAl_2(Al_2Si_2O_{10})(OH)_2$], or chlorite [$(Mg,Fe)_3(Si,Al)_4O_{10}(OH)_2 \cdot (Mg,Fe)3(OH)_6$], and mixtures thereof.

In a preferred embodiment, the inorganic mineral filler is talc, and in a more preferred embodiments, the talc has not been modified by a hydrophobic surface modification. Typically, the (unmodified) talc does not require a dispersant or a surfactant to wet and/or disperse the talc in the molten wax.

In some embodiments, the inorganic hydrophobic mineral filler can be formed by one or more of surface treatment, bulk treatment or compounding of the inorganic hydrophilic mineral to render the inorganic hydrophilic mineral hydrophobic. Non-limiting examples of such treatments for rendering an inorganic hydrophilic mineral hydrophobic (or for increasing the hydrophobicity of the inorganic hydrophobic mineral) are: reducing the moisture content (such as, by heating to reduce its moisture content); adsorbing one or more chemical entities (such as, an oil or surfactant); absorbing one or more chemical entities (such as, an oil or surfactant); chemically and/or physically increasing the hydrophobic nature of the surface (such as, oxidizing and/or reducing the surface or changing the chemical substitutes of the surface), and compounding (such as, blending hydrophobic and hydrophilic minerals to achieve a desired level of hydrophobicity).

Coating compositions of the present invention can include the inorganic hydrophobic mineral filler in a range of amounts. In one embodiment of the present invention, the inorganic hydrophobic mineral filler comprises from about 5 wt % to about 90 wt % of the coating composition. In a preferred embodiment, the inorganic hydrophobic mineral filler comprises from about 5 wt % to about 60 wt % of the coating composition. In a more preferred embodiment, the inorganic hydrophobic mineral filler comprises about 30 wt % of the coating composition.

Coating compositions of the present invention can have barrier properties suitable for protection of substrates when the coating composition is applied to a substrate as a coating. Specifically, the coating composition can have a water vapor transmission rate of less than about 50 $g/m^2/24$ hours as measured at 23° C. and 50% relative humidity, less than about 40 $g/m^2/24$ hours as measured at 23° C. and 50% relative humidity, less than about 30 $g/m^2/24$ hours as measured at 23° C. and 50% relative humidity, less than about 20 $g/m^2/24$ hours as measured at 23° C. and 50% relative humidity, or less than about 10 $g/m^2/24$ hours as measured at 23° C. and 50% relative humidity.

Additionally, in various embodiments of the present invention, the coating composition has a viscosity that is not significantly affected by the presence of the inorganic hydrophobic mineral filler. For example, the molten wax with and without the inorganic hydrophobic mineral filler have substantially the same physical properties (such as, viscosity) and can be processed substantially similarly. In some embodiments, the viscosity of the molten wax with the inorganic hydrophobic mineral filler is less than about 100 times as great as the viscosity of the molten wax without the inorganic hydrophobic mineral filler, and in other embodiments, less than about 90 times, about 80 times, about 70 times, about 60 times, about 50 times, about 40 times, about 30 times, about 20 times, about 10 times, about 9 times, about 8 times, about 7 times, about 6 times, about 5 times, about 4 times, about 3 times or about 2 times as great as the viscosity of the molten wax without the inorganic hydrophobic mineral filler. Further, in other embodiments, the viscosity of the molten wax with the inorganic hydrophobic mineral filler is less than about 1.9 times, about 1.8 times, about 1.7 times, about 1.6 times, about 1.5 times, about 1.4 times, about 1.3 times, about 1.2 times or about 1.1 times as great as the viscosity of the molten wax without the inorganic hydrophobic mineral filler.

In another aspect of the present invention, the coating composition is formed by dispersing, suspending, and/or mixing the inorganic hydrophobic mineral filler in the molten wax. The molten wax is typically formed by any process providing sufficient thermal energy to the wax to exceed the melt temperature of the wax. In one embodiment, the wax is melted prior to the contacting the inorganic hydrophobic mineral filler with the molten wax. In another embodiment, the wax is melted in the presence (that is in contact with) the inorganic hydrophobic mineral filler. Non-limiting methods for dispersing and/or suspending the inorganic hydrophobic mineral filler in the molten wax are: low shear mixing; high shear mixing; ultrasonic mixing; dispersive mixing; agitating; stirring; and vortex mixing. The dispersing and/or suspending of the inorganic hydrophobic mineral filler in the molten wax can be preformed substantially simultaneously with or after the contacting of the inorganic hydrophobic mineral filler with the molten wax.

In another aspect of the present invention is a method of making a coated article, comprising applying a coating composition comprising a wax and an inorganic hydrophobic mineral filler to a substrate to form the coated article. Such substrates can be any suitable substrate for wax-based coatings. In some embodiments, the substrate can be a fibrous substrate. For example, such fibrous substrates can be selected from paper, paperboard, woven material, non-woven material, super-calendered krafts, clay-coated krafts, poly-coated krafts, corrugated board, and cellulosic-containing materials. In addition to fibrous substrates, substrates of the present invention can also include nonfibrous substrates. Examples of such nonfibrous substrates can include, but are not limited to, aluminum foil, polyethylene, polypropylene, poly(ethylene terephthalate) (PET), polymeric materials, and polymeric blends, alloys, and laminates. Substrates, whether fibrous or not, can include a wide variety of product types, such as panels, cartons, cups, plates, and miscellaneous containers and packages Coated articles produced by the above method can have improved barrier properties toward gases, water, water vapor, volatile organic chemicals (VOCs), and resistance to chemicals, as compared to uncoated substrates. The coating can also improve mechanical properties of the substrate, such as tear, scratch and puncture resistance, flexibility and/or tensile strength.

During application of a coating to a substrate in accordance with the present method, coating compositions are typically applied as a liquid at a temperature from about 30° C. to about 200° C. The liquidified coating composition is typically applied by a method selected from curtain coating, roller coating, rod coating, cascade coating, spray coating, impregnation coating, immersion coating, saturation coating, slot orifice coating, calendar coating, extrudable coating, inkjet printing, gravure printing, pad printing, flexographic printing, relief printing, screen printing, rotogravure printing, and any other coating processes used in the art. After applying the liquid coating composition to the substrate, the coating and substrate are cooled, forming the coated article having a solidified coating composition on the fibrous substrate.

Coating composition weights vary with the coating method and type of coated article. For example, in one embodiment, the coating weight for a typical candy wrapper varies from about 1 pound/3,000 $ft^2$ to about 30 pounds/3,000 $ft^2$.

In another embodiment, where the coating composition is applied by a cascade coating process, the coating composition weight varies from about 30 wt % to about 80 wt % of the coated article. For example, in the cascade coating of paper boxes, the coating composition typically varies from about 45 wt % to about 60 wt % of the coated box. In yet another embodiment, where the coating composition is applied by a curtain coating process, the coating composition weight typically varies from about 12 wt % to about 15 wt % of the coated article. In still yet another embodiment, where the application process is by impregnating and/or absorbing the coating composition into the substrate, the coating composition weight commonly varies from about 12 wt % to about 20 wt % of the coated article.

As noted above, the coating composition is typically applied to a substrate and the coating composition is in the absence of emulsifiers, surfactants or dispersants. However, in other embodiments, other additives are optionally added to the coating composition in functional amounts without departing from the scope of this invention. Examples of these additives include, without limitation: heat and ultraviolet light stabilizers, secondary plasticizers, antiblocking agents, colorants, anti-oxidants, slip agents, melt point modifiers, nucleating agents, gloss stabilizers, anti-scuff agents, etc. These additives, if used, are typically utilized in amounts up to about 5 wt % of the coating composition.

In other embodiments of the invention, the coating composition can additionally comprise a polymer. In one preferred embodiment, the polymer can comprises a polyolefin, such as, a low density polyethylene to improve the strength and flexibility of the coating composition. In addition to polyethylene, other useful polymers include, but are not limited to, linear low density polyethylene, high density polyethylene, ethylene propylene copolymers, elastomers, ethylene copolymers containing one or more of the following functional groups, vinyl alcohol, vinyl acetate, acrylic acid, methacrylic acid, methyl acrylate, ethyl acrylate, butyl acrylate, methyl methacrylate, ethyl methacrylate, maleic anhydride, succinic anhydride. The coating compositions comprising polyolefins typically have sufficient thermal stability and melt strength to be applied to the substrate by an extrusion coating process. In one embodiment, the wax to polymer ratio is less than about 50. In another embodiment, the wax to polymer ratio varies from about 50 to about 0.02. It can be appreciated that the wax to polymer ratio is determined by the properties desired, such as barrier capability, adhesion capability, melt rheology, etc.

Coated articles of the invention typically exhibit a water vapor transmission rate of less than about 50 g/m$^2$/24 hours as measured at 23° C. and 50% relative humidity, less than about 40 g/m$^2$/24 hours as measured at 23° C. and 50% relative humidity, less than about 30 g/m$^2$/24 hours as measured at 23° C. and 50% relative humidity, less than about 20 g/m$^2$/24 hours as measured at 23° C. and 50% relative humidity, or less than about 10 g/m$^2$/24 hours as measured at 23° C. and 50% relative humidity.

As noted above, the coating composition of the present invention is useful in a variety of paper packaging applications. In addition, the coating composition provides low cost, high speed coating alternatives to extrusion coating of polymers like polyethylene and nylon.

Additionally, the coating composition can be applied to a substrate without a curing step. This coating composition can be stored for later use and/or used in a conventional coating operation after the preparation thereof.

Additional objects, advantages, and novel features of this invention will become apparent to those skilled in the art upon examination of the following examples thereof, which are not intended to be limiting.

EXAMPLES

Example

Talc having a median particle size of 19.8 μm was formulated with a molten paraffin wax for up to a weight ratio of 70% talc/30% wax. This coating mixture had a similar viscosity as that of the 100% molten wax, thus it requires little or no modification to the coating process. If a higher coating viscosity is tolerated, higher than 70% talc/30% wax ratios can also be achieved.

The talc wetted and dispersed well in the molten wax. When this molten wax-talc coating was coated onto a paper sheet, its appearance was as smooth as that of the 100% wax. No surface modification of talc was needed; and no dispersant or surfactant was needed to wet and disperse talc into the molten wax.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A coated article comprising:
   a) a substrate;
   b) a coating composition comprising a wax and an inorganic hydrophobic mineral filler; and
   wherein at least about 50 wt % of the inorganic hydrophobic mineral filler has a particle size of less than about 75 μm, and wherein the inorganic hydrophobic mineral filler has a particle size distribution having more larger size particles than smaller size particles.

2. The coated article of claim 1, wherein the inorganic hydrophobic mineral filler comprises talc.

3. The coated article of claim 1, wherein at least about 50 wt % of the inorganic hydrophobic mineral filler comprises particles having a particle size of less than about 45 μm.

4. The coated article of claim 1, wherein the inorganic hydrophobic mineral filler comprises from about 5 wt % to about 90 wt % of the coating composition.

5. The coated article of claim 1, wherein the inorganic hydrophobic mineral filler comprises from about 5 wt % to about 60 wt % of the coating composition.

6. The coated article of claim 1, wherein the inorganic hydrophobic mineral filler comprises about 30 wt % of the coating composition.

7. The coated article of claim 1, wherein the inorganic hydrophobic mineral filler has a moisture content of less than about 45 wt %.

8. The coated article of claim 1, wherein the substrate is a fibrous substrate selected from the group consisting of paper, paperboard, woven material, non-woven material, super-calendered krafts, clay-coated krafts, poly-coated krafts, corrugated board, and cellulosic-containing materials.

9. The coated article of claim 1, wherein the coating composition has a water vapor transmission rate of less than about 50 g/m$^2$/24 hours as measured at 23° C. and 50% relative humidity.

10. The coated article of claim 1, wherein the inorganic hydrophobic mineral filler has a contact angle with water of at least about 90°.

11. The coated article of claim 1, wherein the inorganic hydrophobic mineral filler has a contact angle with water of at least about 120°.

12. The coated article of claim 1, wherein the wax is selected from the group consisting of microcrystalline waxes, paraffin waxes, synthetic waxes, semi-crystalline waxes, petroleum waxes, chemically modified waxes, animal waxes, vegetable waxes, mineral waxes and mixtures.

13. The coated article of claim 1, wherein the inorganic hydrophobic mineral filler is formed by one of surface treatment, bulk treatment or compounding of an inorganic hydrophilic material, wherein the inorganic hydrophilic material is selected from the group consisting of clays, calcium carbonates, dolomites, micas, alumina trihydrates, magnesium hydroxides, titanium dioxides, barium sulphates, silicas, alkali metal aluminosilicates, talcs, alkaline-earth metal aluminosilicates, phyllosilicate minerals, and mixtures thereof.

14. The coated article of claim 13, wherein the wax is selected from the group consisting of straight chain saturated n-alkane hydrocarbons, isoparaffinic hydrocarbons, naphthenic hydrocarbons, n-alkane saturate hydrocarbons, paraffin and microcrystalline wax mixtures, Fisher-Tropsch waxes, polyethylene waxes, polypropylene waxes, polymethylene waxes, chemically modified waxes, polymerized alpha-olefins waxes, polyethylene-block-polyethylene glycol waxes, polyethylene mono-alcohol waxes, polyethylene-block-polyethylene glycol and polyethylene mono-alcohol wax mixtures, paraffin waxes chemically modified by adduct formation, cracking reaction, and free radical reaction, and mixtures thereof.

15. A coated article comprising:
a) a substrate;
b) a coating composition comprising a wax and a talc; and wherein at least about 50 wt % of the talc has a particle size of less than about 75 μm, and wherein the talc has a particle size distribution having more larger size particles than smaller size particles.

16. The coated article of claim 15, wherein at least about 50 wt % of the talc comprises particles having a particle size of less than about 45 μm.

17. The coated article of claim 15, wherein the talc comprises from about 5 wt % to about 90 wt % of the coating.

18. The coated article of claim 15, wherein the talc comprises from about 5 wt % to about 60 wt % of the coating.

19. The coated article of claim 15, wherein the talc comprises about 30 wt % of the coating.

20. The coated article of claim 15, wherein the talc has a moisture content of less than about 45 wt %.

21. The coated article of claim 15, wherein the substrate is a fibrous selected from the group consisting of paper, paperboard, woven material, non-woven material, super-calendered hafts, clay-coated hafts, poly-coated hafts, corrugated board, and cellulosic-containing material.

22. The coated article of claim 15, wherein the coating composition has a water vapor transmission rate of less than about 50 g/m²/24 hours as measured at 23° C. and 50% relative humidity.

23. The coated article of claim 15, wherein the talc has a contact angle with water of at least about 90°.

24. The coated article of claim 15, wherein the inorganic hydrophobic mineral filler has a contact angle with water of at least about 120°.

25. The coated article of claim 15, wherein the wax is selected from the group consisting of microcrystalline waxes, paraffin waxes, synthetic waxes, semi-crystalline waxes, petroleum waxes, chemically modified waxes, animal waxes, vegetable waxes, mineral waxes and mixtures.

26. The coated article of claim 15, wherein the wax is selected from the group consisting of straight chain saturated n-alkane hydrocarbons, isoparaffinic hydrocarbons, naphthenic hydrocarbons, n-alkane saturate hydrocarbons, paraffin and microcrystalline wax mixtures, Fisher-Tropsch waxes, polyethylene waxes, polypropylene waxes, polymethylene waxes, chemically modified waxes, polymerized alpha-olefins waxes, polyethylene-block-polyethylene glycol waxes, polyethylene mono-alcohol waxes, polyethylene-block-polyethylene glycol and polyethylene mono-alcohol wax mixtures, paraffin waxes chemically modified by adduct formation, cracking reaction, and free radical reaction, and mixtures thereof.

27. A method of making a coated article comprising applying a coating composition to at least one surface of a substrate, wherein the coating composition comprises a wax and an inorganic hydrophobic mineral filler, wherein at least about 50 wt % of the inorganic hydrophobic mineral filler has a particle size of less than about 75 μm, and wherein the inorganic hydrophobic mineral filler has a particle size distribution having more larger size particles than smaller size particles.

28. A coating composition comprising:
a wax; and
an inorganic hydrophobic mineral filler, wherein at least about 50 wt % of the inorganic hydrophobic mineral filler has a particle size of less than about 75 μm, and wherein the inorganic hydrophobic mineral filler has a particle size distribution having more larger size particles than smaller size particles.

29. The coated article of claim 1, wherein at least about 80 wt % of the inorganic hydrophobic mineral filler comprises particles having a particle size of less than about 45 μm.

30. The coated article of claim 15, wherein at least about 80 wt % of the talc comprises particles having a particle size of less than about 45 μm.

31. The coated article of claim 1, wherein at least about 80 wt % of the inorganic hydrophobic mineral filler comprises particles having a particle size of less than about 75 μm.

32. The coated article of claim 15, wherein at least about 50 wt % of the talc comprises particles having a particle size of less than about 75 μm.

33. The coated article of claim 15, wherein at least about 80 wt % of the talc comprises particles having a particle size of less than about 75 μm.

* * * * *